(12) United States Patent
Stewart et al.

(10) Patent No.: US 11,803,575 B2
(45) Date of Patent: Oct. 31, 2023

(54) APPARATUS, SYSTEM, AND METHOD FOR CLASSIFYING AND NEUTRALIZING BIAS IN AN APPLICATION

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/582,113

(22) Filed: Jan. 24, 2022

(65) Prior Publication Data
US 2023/0237072 A1   Jul. 27, 2023

(51) Int. Cl.
*G06F 16/00* (2019.01)
*G06F 16/28* (2019.01)

(52) U.S. Cl.
CPC .................. *G06F 16/285* (2019.01)

(58) Field of Classification Search
CPC ..... G06F 16/24578; G06F 16/41; G06F 16/61
USPC ........................................................ 707/738
See application file for complete search history.

(56) References Cited

U.S. PATENT DOCUMENTS

| | | | |
|---|---|---|---|
| 10,467,339 B1 * | 11/2019 | Shen | G06F 40/247 |
| 10,685,329 B2 | 6/2020 | Taylor et al. | |
| 10,839,153 B2 | 11/2020 | Gaur et al. | |
| 10,936,642 B2 | 3/2021 | Shen et al. | |
| 11,048,741 B2 | 6/2021 | Cintas et al. | |
| 11,176,271 B1 | 11/2021 | Garg et al. | |
| 2015/0371191 A1 * | 12/2015 | Taylor | G06Q 10/063114 705/321 |
| 2016/0055457 A1 | 2/2016 | Mather et al. | |
| 2016/0224574 A1 * | 8/2016 | Horvitz | G06F 16/332 |
| 2016/0224662 A1 * | 8/2016 | King | G06F 16/951 |
| 2017/0039469 A1 * | 2/2017 | Majumdar | G06N 3/0445 |
| 2018/0025303 A1 * | 1/2018 | Janz | G16H 50/20 705/2 |
| 2018/0181808 A1 * | 6/2018 | Sridharan | G06K 9/6269 |
| 2019/0042894 A1 * | 2/2019 | Anderson | G06N 20/00 |
| 2019/0349333 A1 * | 11/2019 | Pickover | G06N 20/00 |
| 2020/0210695 A1 | 7/2020 | Walters et al. | |
| 2020/0233910 A1 | 7/2020 | Bhide et al. | |
| 2021/0201193 A1 * | 7/2021 | Walters | G06F 16/285 |
| 2021/0264373 A1 | 8/2021 | Garg et al. | |
| 2021/0295170 A1 * | 9/2021 | Agrawal | G06N 3/088 |
| 2021/0383268 A1 * | 12/2021 | Miroshnikov | G06F 17/16 |
| 2022/0012591 A1 * | 1/2022 | Dalli | G06F 17/18 |
| 2022/0101146 A1 * | 3/2022 | el Kaliouby | G06N 3/088 |

(Continued)

OTHER PUBLICATIONS

Embroker Team, What Is Blind Hiring? (How to Implement It), Jul. 6, 2021.

(Continued)

*Primary Examiner* — Cheryl Lewis
(74) *Attorney, Agent, or Firm* — CALDWELL INTELLECTUAL PROPERTY LAW

(57) ABSTRACT

An apparatus for classifying and neutralizing bias, wherein the apparatus includes a computing device configured to receive candidate data items as a function of a candidate application, identify a potential bias of the candidate data items, and block the potential bias by removing the candidate data item associated with the potential bias from the candidate application.

16 Claims, 6 Drawing Sheets

(56) References Cited

U.S. PATENT DOCUMENTS

2022/0108222 A1* 4/2022 Brannon ................ G06N 20/00
2022/0277232 A1* 9/2022 Jones .................... G06N 20/20

OTHER PUBLICATIONS

Florentine, Sharon, How artificial intelligence can eliminate bias in hiring, Dec. 22, 2016.
Applied, Job Description Analysis Tool, Dec. 31, 2021.

* cited by examiner

APPARATUS, SYSTEM, AND METHOD FOR CLASSIFYING AND NEUTRALIZING BIAS IN AN APPLICATION

FIELD OF THE INVENTION

The present invention generally relates to the field of human resource technology. In particular, the present invention is directed to an apparatus, system, and method for classifying and neutralizing bias.

BACKGROUND

Neutralizing bias from an application is important because it allows its reader to critically and independently review the application and avoid treatments which are suboptimal or potentially harmful. Removing bias limits the scope for a candidate to be chosen for a specific reason or opinion.

SUMMARY OF THE DISCLOSURE

In an aspect, an apparatus for classifying and neutralizing bias includes a computing device configured to receive candidate data items as a function of a candidate application, identify a potential bias of the candidate data items, and block the potential bias by removing the candidate data item associated with the potential bias from the candidate application. Identifying a potential bias includes extracting, from the candidate data item, a plurality of candidate data item content elements, classifying each content element of the plurality of candidate item data content elements to a candidate data item object of a plurality of candidate data item objects using an item classifier, generating, using bias training data, a potential bias classifier, wherein the potential bias classifier inputs candidate data item objects and outputs a potential bias of the candidate item, and classifying the plurality of candidate data item objects to potential biases using the potential bias theme classifier.

In another aspect, a method for classifying and neutralizing bias is illustrated. The method is performed by a computing device and includes receiving candidate data items as a function of a candidate application, identifying a potential bias of the candidate data items, wherein the identification includes, extracting, from the candidate data item, a plurality of candidate data item content elements, classifying each content element of the plurality of candidate item data content elements to a candidate data item object of a plurality of candidate data item objects using an item classifier, generating, using bias training data, a potential bias classifier, wherein the potential bias classifier inputs candidate data item objects and outputs a potential bias of the candidate item, classifying the plurality of candidate data item objects to potential biases using the potential bias theme classifier, and blocking the potential bias by removing the candidate data item associated with the potential bias from the candidate application.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, embodiments disclosed herein exemplify an apparatus for removing bias from an application. Aspects of the present disclosure include a computing device configured to receive candidate data items as a function of a candidate application. Aspects of the present disclosure may include the computing device configured to identify a potential bias of the candidate data items. Aspects of the present disclosure may also include the computing device configured to block the potential bias by removing the candidate data item associated with the potential bias from the candidate application.

Figure 1:
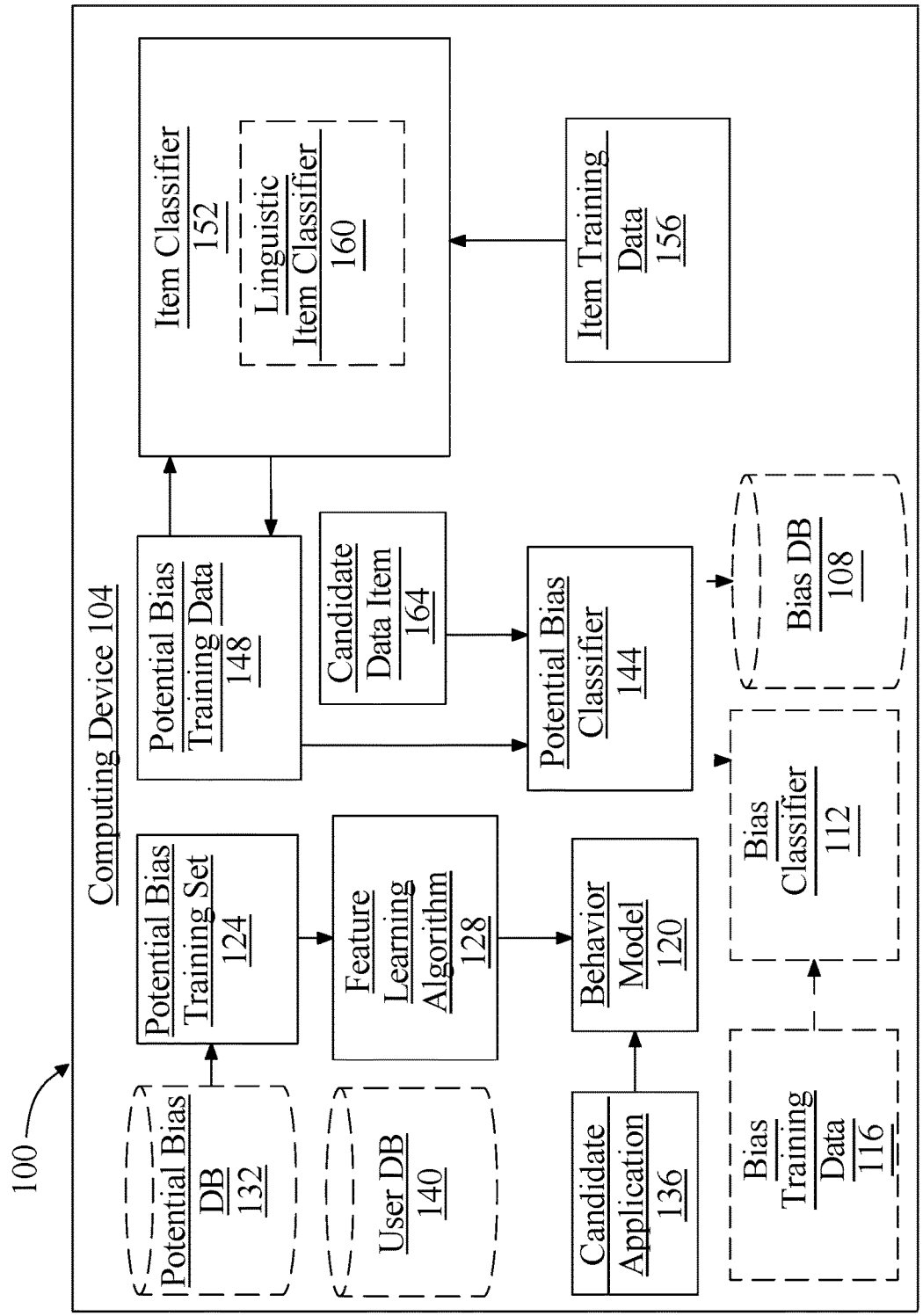
FIG. 1 is a block diagram illustrating an exemplary embodiment of an apparatus for removing bias from an application.

Referring now to FIG. 1, an exemplary embodiment of an apparatus 100 for removing bias in an application is illustrated. Apparatus 100 includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices 104 in a first location and a second computing device 104 or cluster of computing devices 104 in a second location. Computing device 104 may include one or more computing devices 104 dedicated to data storage, security, distribution of traffic for load balancing, and the like. Computing device 104 may distribute one or more computing tasks as described below across a plurality of computing devices 104 of computing device 104, which may operate in parallel, in series, redundantly, or in any other manner used for distribution of tasks or memory between computing devices 104. Computing device 104 may be implemented using a "shared nothing" architecture in which data is cached at the worker; in an embodiment, this may enable scalability of apparatus 100 and/or computing device 104.

Still referring to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, computing device 104 may be designed and configured to receive candidate data items 164 as a function of a candidate application. A "candidate data item" is specific data concerning the candidate that is extracted from the application. Candidate data items 164 may be, without limitation, the candidate's name, gender, past work experience, social cues, language, location, skills, awards, e-mail address, or any other piece of information given in an application. Candidate application may be validated on an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered; a "blockchain" is a system of recording information in a way that makes it difficult or impossible to change, hack, or cheat the system. Immutable sequential listing and blockchain is further explained herein with reference to FIG. 3.

Still referring to FIG. 1, computing device 104 is further configured to identify a potential bias of the candidate data items 164. A "bias" is prejudice in favor of or against one thing, person, or group compared with another in a way considered to be unfair. A "potential bias," in this disclosure, is any piece of information found in a candidate data item 164 that may convey a bias. Potential bias may be detected in a candidate data item 164 if it is prejudicial in any way. Identifying a potential bias may further include identifying a potential bias field, which is a category of potential biases. Potential bias fields may include ageism, classism, lookism, racism, sexism, bribery, academic bias, gatekeeping, or the like. Computing device 104 identifies the potential bias from a predetermined plurality of potential biases, which is further explained below.

Still referring to FIG. 1, computing device may identify a plurality of potential biases and classify these biases to a potential bias of the plurality of potential biases. Alternatively or additionally, computing device 104 may identify plurality of potential biases by querying a bias database 108 using user-entered data. In an embodiment, bias database 108 may include any data structure for ordered storage and retrieval of data, which may be implemented as a hardware or software module. bias database 108 may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a bias database 108 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a bias database 108 may reflect categories, cohorts, and/or populations of data consistently with this disclosure.

Still referring to FIG. 1, bias database 108 may be populated with one or more relationships between labels, objects, themes, or the like, as introduced in further detail below, and potential bias; such relationships may be entered in bias database 108 by users, where user entry may include entry by one or more expert users such as psychologists, medical experts, or the like, "crowd-sourced" entry by large numbers of users, which may be aggregated, or the like. Where user entries are aggregated, aggregated results may include comparison of aggregated values to threshold numbers; for instance, a relationship between a given label and a potential bias may be recorded where more than a threshold percentage of user entries have identified the two as linked. Relationships between labels, objects, themes, or the like, as introduced in further detail below, and candidate data items may alternatively or additionally be entered by computing device from a bias classifier as described below; for instance, a label may be entered in bias database 108 with a potential bias most probably associated therewith as identified by a bias classifier.

Alternatively or additionally, and still referring to FIG. 1, computing device 104 may input user inputs to a bias classifier 112 and receive an output classifying user inputs to one or more candidate data items 164. Computing device 104 may generate bias classifier 112 using a classification algorithm, defined as a processes whereby a computing device 104 derives, from training data, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure.

Still referring to FIG. 1, bias training data 116, used herein as training data used to generate bias classifier 112, may include, without limitation, a plurality of data entries, each data entry including one or more themes and/or objects and one or more potential biases represented thereby and/or associated therewith. bias training data 116 and/or elements thereof may be entered by users, for instance via graphical user interface forms; as a non-limiting example, each such form may present to a user a geometric form, word, image, or the like, and a user may select a label of a candidate data item for each such geometric form, word, image, or the like from a list of labels provided to the user and/or may enter one or more words in a text entry element, which may be mapped to labels using language processing as described below. As a non-limiting example, a candidate data item that portrays user's email address may be inputted, and computing device may "tag" or identify one or more numbers and or words in the email address as associated with racism or sexism, such as a racial slur, graphic images, sexual language, anti-Semitic language, or the like; a user may further label a name of a restaurant in their work experience to convey prejudiced opinions against a certain ethnicity. As a further example a candidate data item that may be received is a skill, but the skill may insinuate harmful language or actions against a certain gender.

Still referring to FIG. 1, computing device 104 may be configured to generate bias classifier 112 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate bias classifier 112 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, a plurality of attributes of a candidate data item, such as spoken or written text, objects depicted in images, metadata, or the like, to clusters representing themes.

Vice classifier 112 may content elements to clusters corresponding to labels of potential bias. Where bias classifier 112 is updated, for instance by adding to a list of potential biases corresponding to clusters and rerunning bias classifier 112 to classify to the updated list, content elements stored in memory may be subjected to bias classifier 112 again to update association of content elements with potential bias; each of these actions, including without limitation rerunning bias classifier 112 to classify to the updated list and/or updating potential biases, may be performed by computing device 104. bias classifier 112 may be run against one or more sets of bias training data 116, where bias training data 116 may include any form of training data as described above.

In an embodiment, and still referring to FIG. 1, computing device 104 may detect a candidate data set, defined herein as a set or more elements of candidate data items, correlated with a potential bias in a potential bias training set 124, which may include training data as described above containing a plurality of pairs of candidate data sets and actions performed by persons in reaction to such candidate data set; such a training set may be compiled using candidate data items gathered from populations of applications. A pair of a candidate data set and a potential bias may include, for instance, a candidate data item or set thereof extracted from an application who had already previously included bias in its contents; latent patterns may be present in such data that, when considered in larger numbers, may make correlations between combinations of candidate data items and a given potential bias apparent when analyzed.

With continued reference to FIG. 1 computing device 104 may be designed and configured to identify a set of potential biases that may correspond to candidate data items using a behavior model 120 trained using a potential bias training set 124. Computing device 104 may generate behavior model 120 using one or more machine-learning processes, which may include any machine-learning processes as described below. Set of potential biases may include a set of behaviors that react to particular elements of candidate data; in other words, behavior model 120 may act to identify clusters of behavior and associated clusters of candidate data, which in turn may indicate biased behaviors and triggers therefor in candidate data. In some embodiments, clusters so identified may be labeled automatically, for instance using random or pseudorandom identifiers, and/or may presented to a user for labeling based on a social or linguistic characterization of the bias apparently revealed. Such potential biases may be added to bias database 108.

Continuing to refer to FIG. 1, machine-learning algorithms may be implemented using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure, Still referring to FIG. 1, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 1, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 1, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised machine-learning process may include a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs. Machine learning model is further described herein with reference to FIG. 4.

With continued reference to FIG. 1, supervised machine-learning processes may include classification algorithms, defined as processes whereby a computing device 104 derives, from training data, a model for sorting inputs into categories or bins of data. Classification may be performed using, without limitation, linear classifiers such as without limitation logistic regression and/or naive Bayes classifiers, nearest neighbor classifiers including without limitation k-nearest neighbors classifiers, support vector machines, decision trees, boosted trees, random forest classifiers, and/or neural network-based classifiers.

Still referring to FIG. 1, machine learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like. Unsupervised machine-learning algorithms may include, without limitation, clustering algorithms and/or cluster analysis processes, such as without limitation hierarchical clustering, centroid clustering, distribution clustering, clustering using density models, subspace models, group models, graph-based models, signed graph models, neural models, or the like. Unsupervised learning may be performed by neural networks and/or deep learning protocols as described above.

Continuing to refer to FIG. 1, machine-learning processes as described in this disclosure may be used to generate machine-learning models. A machine-learning model, as used herein, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 1, computing device 104 may be configured to generate behavior model 120 using a first feature learning algorithm 128 and potential bias training data 124. A "feature learning algorithm 128," as used herein, is a machine-learning algorithm that identifies associations between elements of data in a training data set, where particular outputs and/or inputs are not specified. For instance, and without limitation, a feature learning algorithm 128 may detect co-occurrences of sets of candidate data items, as defined above, with each other and with potential biases. Computing device 104 may perform a feature learning algorithm 128 by dividing candidate data items from a given user into various sub-combinations of such data to create candidate data sets as described above and evaluate which candidate data sets tend to co-occur with which other candidate data sets, and potential bias. In an embodiment, first feature learning algorithm 128 may perform clustering of data; for instance, a number of clusters into which data from training data sets may be sorted using feature learning may be set as a number of potential biases.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance potential bias training set 124 as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and bias versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified candidate data items and/or combinations thereof with potential biases as inputs and outputs a definite number of classified data entry cluster wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to classify a given potential bias to one or more candidate data sets, enabling computing device 104 to identify candidate data sets correlated with potential biases.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $argmin_{c_i \in C} dist(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i=1/|S_i|\Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected candidate data sets and potential biases. Degree of similarity index value may indicate how close a particular combination of potential biases is to being classified by k-means algorithm to a particular cluster. K-means clustering algorithm may evaluate the distances of the combination of potential biases to the k-number of clusters output by k-means clustering algorithm. Short distances between a potential bias and a cluster may indicate a higher degree of similarity between potential biases and a particular cluster. Longer distances between potential biases and a cluster may indicate a lower degree of similarity between potential biases and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between candidate data sets, potential biases and a particular data entry cluster. Alternatively or additionally k-means clustering algorithm may select a plurality of clusters having low degree of similarity index values to candidate data sets, potential biases, indicative of greater degrees of similarity. Degree of similarity index values may be compared to a threshold number indicating a minimal degree of relatedness suitable for inclusion of candidate data sets, potential biases in a cluster, where degree of similarity indices falling under the threshold number may be included as indicative of high degrees of relatedness. The above-described illustration of feature learning using k-means clustering is included for illustrative purposes only and should not be construed as limiting potential implementation of feature learning algorithms 128; persons skilled in the art, upon reviewing the entirety of this disclosure, will be aware of various additional or alternative feature learning approaches that may be used consistently with this disclosure.

With continued reference to FIG. 1, potential bias training set 124 may be stored in and/or retrieved from one or more databases; for instance, a potential bias training set may be stored in and/or retrieved from a potential bias training database. Potential bias training database may include any data structure suitable for use as bias database 108 as described above. Data entries in a potential bias training database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a user database may reflect categories of data consistently with this disclosure. Potential bias training database may include one or more tables from which data records may be retrieved with linking data. One or more tables may include a candidate data item table and a potential bias table, which are further described below with reference to FIG. 2.

Alternatively or additionally, and still referring to FIG. 1, potential bias training set 124 and/or data used therefor, including without limitation candidate data items and/or data describing potential bias, may be stored in a potential bias training database 132, which may be implemented in any way suitable for implementation of a bias database 116 as described above.

Figure 2:
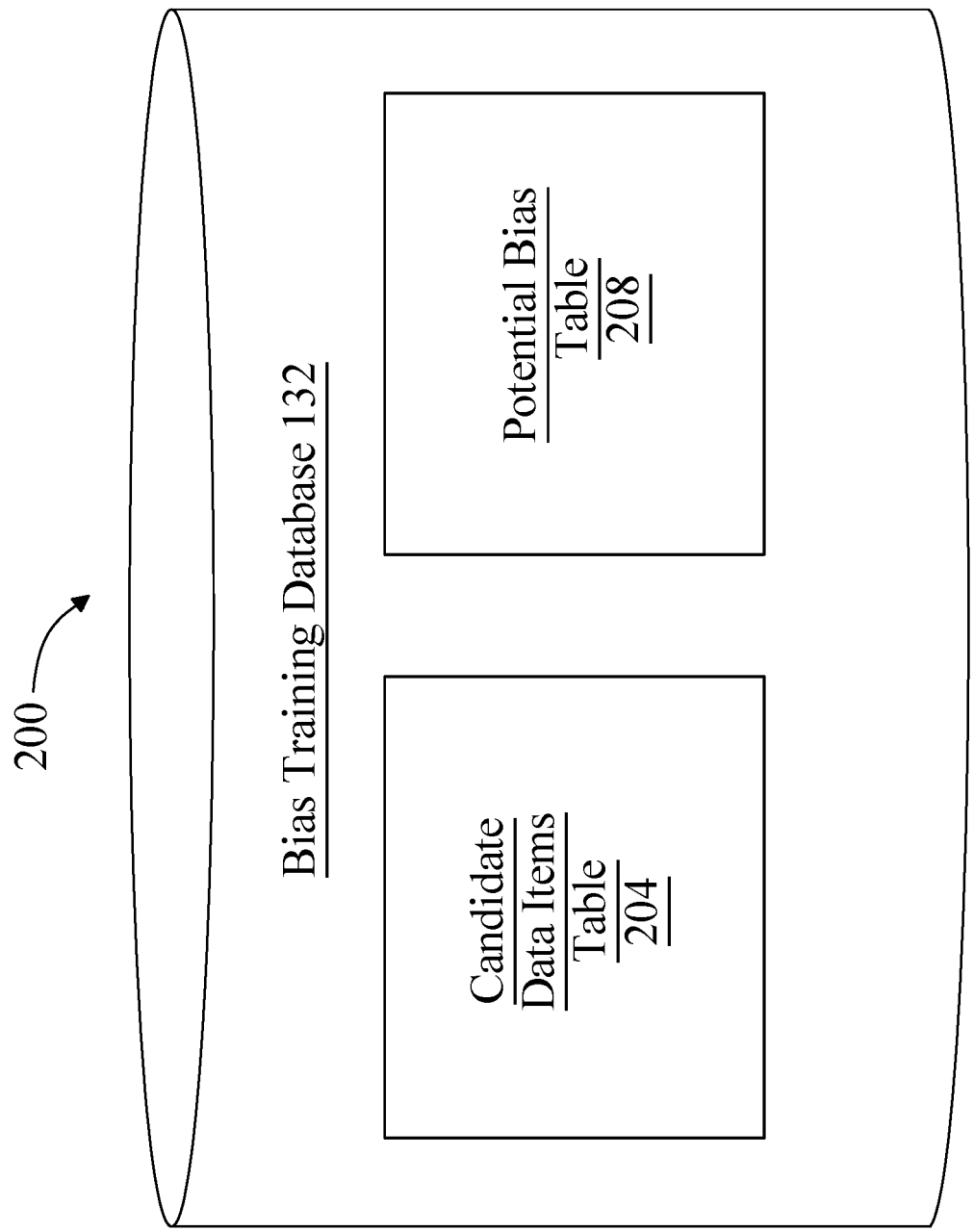
FIG. 2 is a block diagram illustrating an exemplary embodiment of a bias training database.

Referring now to FIG. 2, an exemplary embodiment 200 of potential bias training database 132 is illustrated. Potential bias training database 132 may be implemented as any data structure suitable for use as clustering database 120 as described above in reference to FIG. 1. Potential bias training database 132 may store one or more potential biases. One or more tables contained within potential bias training database 132 may include candidate data items table 204; candidate data items table 204 may store one or more candidate data items relating to the candidate. One or more tables contained within potential bias training database 132 may include potential bias table 208; potential bias table 208 may store one or more candidate data items obtained from an application that were flagged for bias.

Referring again to FIG. 1, computing device 104 is configured to identify a potential bias of the candidate data items. The identification includes generate, using bias training data, a potential bias classifier, wherein the potential bias classifier inputs candidate data items and outputs a potential bias of the candidate item, extract, from the candidate data item, a plurality of candidate data item content elements, classify each content element of the plurality of candidate item data content elements to a candidate data item object of a plurality of candidate data item objects using an item classifier, and input the plurality of candidate data item objects to the potential bias theme classifier.

Still referring to FIG. 1, computing device 104 is configured to generate a potential bias classifier 144 using potential bias training data. Potential bias classifier 144 inputs candidate data items 164 and outputs a potential bias of the candidate item. Potential bias training data 148 may be populated by receiving a plurality of user inputs, for instance via graphical user interface forms; as a non-limiting example, each such form may present to a user at least a candidate data item and a user may select a label for each such candidate data item from a list of labels provided to the user and/or may enter one or more words in a text entry element, which may be mapped to labels using language processing as described below; label selected by user may correspond to a user-entered identification of a potential bias of the candidate data item. Potential bias classifier 144 may input candidate data items and output potential biases. Biases to which potential bias classifier 144 may classify candidate data may include biases previously identified using bias database, user entries, and/or behavior model 120.

Continuing to refer to FIG. 1, computing device 104 is configured to generate potential bias classifier 144 using a classification algorithm, which may be implemented, without limitation, using any classification algorithm suitable for generating a bias classifier 112 as described above. As a non-limiting example, potential bias classifier 144 may use a K-nearest neighbors algorithm that may be configured to classify an input vector including a plurality of attributes of a candidate item, such as spoken or written text, objects depicted in images, metadata, etc., to clusters representing themes. Potential bias classifier 144 may alternatively or additionally be created using a naïve-Bayes classification algorithm as described above. Potential bias classifier 144 may enable computing device 104 to identify a single theme represented by the best-matching cluster and/or some number of best-matching clusters, such as the K best matching clusters; in the latter case, matching a theme as described below may include matching any of the K best themes, or the most probable theme may be treated as the main theme and the remaining matching clusters may be treated as identifying themes of secondary importance.

Still referring to FIG. 1, identifying a potential bias also includes extracting, from the candidate data item 164, a plurality of candidate data item content elements. A "content element" is an image, word, number, or anything shown in a candidate data item that may convey prejudice. Once these content elements are extracted, computing device 104 classifies each content element of the plurality of candidate item data content elements to a candidate data item object of a plurality of candidate data item objects using an item classifier 152.

In an embodiment, and continuing to refer to FIG. 1, computing device 104 may modify potential bias training data 148, for instance to replace a candidate data item with plurality of candidate data item objects; plurality of candidate data item objects may be used as attributes of a vector associated with a candidate data item in potential bias training data 148, for instance for use in KNN or other classification algorithms as described above. Objects of plurality of candidate data item objects may include, without limitation, objects depicted in images or frames of application, objects described in textual data extracted from images or text, and/or converted from spoken words in application, or the like. In an embodiment, computing device 104 may be configured to extract, from each candidate data item, a plurality of content elements, such as without limitation geometric forms extracted from images and/or video frames, words or phrases of textual data, or the like. Computing device 104 may be configured to classify each content element of the plurality of content elements to an object of a plurality of candidate data item objects using an item classifier 152, where the item classifier 152 may be generated using any classification algorithm as described above. Item classifier 152 may classify words, phrases, and/or geometrical forms to clusters corresponding to labels of objects, enabling a vector representing presence or relative frequency of objects to be created, for instance by populating a vector index corresponding to each of a list of objects with a number indicating presence or absence of an object corresponding to an index and/or a number indicating a number of occurrences of an object corresponding to an index. In the latter case, as a non-limiting example, a higher number may indicate a greater prevalence of a given object in the candidate data item, which may, as a non-limiting example, cause potential bias classifier 144 to classify candidate data item to a theme consistent with a higher prevalence of a given object; prevalence and/or relative frequency of an object in candidate data item may also be used, as described below, to determine a degree to which the object is presented in the candidate data item for additional processing. In an embodiment, computing device 104 may replace candidate data item with a plurality of objects as described above in potential bias training data 148; for instance, a separate instance of potential bias training data 148 in which candidate data items are replaced with plurality of objects may be generated, permitting use thereof in place of the original potential bias training data 148. Where item classifier 152 is updated, for instance by adding to a list of objects corresponding to clusters and rerunning item classifier 152 to classify to the updated list, candidate data items stored in memory may be subjected to item classifier 152 again to update each plurality of candidate data item objects; each of these actions, including without limitation rerunning item classifier 152 to classify to the updated list and/or updating plurality of objects, may be performed by computing device 104. Potential bias classifier 144 may likewise be updated by rerunning classification algorithms on updated media training data 148. Identifying a potential bias further includes inputting the plurality of candidate data item objects to the potential bias theme classifier 144.

Still referring to FIG. 1, item classifier 152 and/or classifiers may be run against one or more sets of item training data 156, where item training data 156 may include any form of item training data 156 as described above. Item training data 156 may include, without limitation, a plurality of data entries, each data entry including one or more content elements and one or more objects represented thereby. Item training data 156 and/or elements thereof may be entered by users, for instance via graphical user interface forms; as a non-limiting example, each such form may present to a user a geometric form, word, image, or the like, and a user may select a label for each such geometric form, word, image, or the like from a list of labels provided to the user and/or may enter one or more words in a text entry element, which may be mapped to labels using language processing as described below.

Still referring to FIG. 1, extracting a plurality of candidate data item content elements comprises of extracting a plurality of textual elements from a candidate application and classifying the plurality of textual elements to a potential bias using a linguistic item classifier. Computing device 104 may be configured to classify textual elements to objects using a linguistic item classifier 160; that is, item classifier 152 may include a linguistic item classifier 160. Textual elements may include words or phrases, as described in further detail below, extracted from textual data such as documents or the like. Textual elements may include other forms of data converted into textual data, such as without limitation textual data converted from audio data using speech-to-text algorithms and/or protocols, textual data extracted from images using optical character recognition (OCR), or the like. Linguistic item classifier 160 may include any classifier described above; linguistic item classifier 160 may generate an output classifying an element of textual data to an object according to any classification algorithm as described above. In an embodiment, computing device 104 may train linguistic item classifier 160 using a linguistic classification training set, which may, as a non-limiting example, include elements of textual data and identifications of one or more objects associated therewith. Linguistic classification training set may, for instance, be populated by user entries of textual data along with corresponding user entries identifying and/or labeling objects as described above. Computing device 104 may be configured to extract the plurality of content elements by extracting a plurality of textual elements from a verbal component of the candidate data item and classify the plurality of textual elements using linguistic item classifier 160.

Generation of linguistic classification training set, mapping of user entries to object labels, and/or classification of textual objects to labels may alternatively or additionally be performed using a language processing algorithm. As used herein, language processing algorithm may operate to produce a language processing model. Language processing model may include a program automatically generated by language processing algorithm to produce associations between one or more words and/or phrases, including without limitation mathematical associations, between such words. Associations between language elements, where language elements include for purposes herein extracted words and/or object labels, without limitation, mathematical associations, including without limitation statistical correlations between any language element and any other language element and/or language elements. Statistical correlations and/or mathematical associations may include probabilistic formulas or relationships indicating, for instance, a likelihood that a given word and/or phrase indicates a given object label and/or a given additional word and/or phrase. As a further example, statistical correlations and/or mathematical associations may include probabilistic formulas or relationships indicating a positive and/or negative association between at least a word and/or phrase and an object label and/or an additional word.

Still referring to FIG. 1, language processing algorithm may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a bidden state to be estimated may include an association between at least a word and/or phrase and an object label and/or an additional word. There may be a finite number of labels, words and/or phrases, and/or relationships therebetween; an EDAM inference algorithm, such as the forward-backward algorithm or the Viterbi algorithm, may be used to estimate the most likely discrete state given a word or sequence of words. Language processing algorithm may combine two or more approaches. For instance, and without limitation, machine-learning program may use a combination of Naive-Bayes, Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing algorithm may use a corpus of documents to generate associations between language elements in a language processing algorithm, and computing device 104 may then use such associations to analyze words extracted from one or more documents and determine that the one or more documents indicate a given relationship between at least a word and/or phrase and an object label and/or an additional word. In an embodiment, computing device 104 may perform this analysis using a selected set of significant documents, such as documents identified by one or more users and/or expert users, and/or a generalized body of documents and/or co-occurrence data, which may be compiled by one or more third parties. Documents and/or co-occurrence data may be received by computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, computing device 104 may automatically obtain the documents, co-occurrence data, or the like by downloading and/or navigating to one or more centralized and/or distributed collections thereof. Computing device 104 may alternatively or additionally receive any language processing model from one or more remote devices or third-party devices and utilize such language processing model as described above.

With continued reference to FIG. 1, computing device 104 is configured to identify a potential bias of a candidate data item 164 using potential bias classifier 144. Computing device 104 may input candidate data item 164 to potential bias classifier 144, which may output a potential bias, for instance by identifying a cluster, corresponding to a bias, which is most closely associated with candidate data item 164, as described above. In an embodiment, computing device 104 may input a plurality of objects identified in candidate data item 164 to potential bias classifier 144. For instance, and without limitation, computing device 104 may extract a plurality of content elements from candidate data item 164, where extraction may be performed in any manner described above. Computing device 104 may classifying each content element of plurality of content elements to an object of a plurality of objects using an item classifier 152, which may be any item classifier 152 or collection of item classifiers 152 as described above. Computing device 104 may input plurality of objects to the potential bias classifier 144.

Still referring to FIG. 1, computing device 104 may combine the above assessments in any suitable way that may occur to persons skilled in the art upon reviewing the entirety of this disclosure. By way of illustration, and as a non-limiting example, computing device 104 may establish a rule whereby a tally and/or proportion of one or more objects associated with potential bias, and/or grade thereof as described above, combined with a degree of relatedness and/or grade of secondary theme with potential bias, may cause computing device 104 to block transmission and/or display of candidate data item 164 with detected potential bias; threshold applied to object and threshold applied to secondary theme may each be insufficient to trigger blocking candidate data item 164 alone, but the combination thereof may be sufficient to cause computing device 104 to block candidate data item 164. Blocking the potential bias includes matching a candidate data item content element to a potential bias. Blocking the potential bias may include classifying a candidate data item content element of the plurality of candidate data item content elements to a non-biased element. A "non-biased element" is an element that is not associated with a bias while having a similar semantic meaning to a biased element.

Still referring to FIG. 1, once potential bias is detected in a candidate data item 164, computing device 104 blocks the potential bias by removing the candidate data item 164 associated with the potential bias from the candidate application 136. Computing device 104 may be programmed to block out the candidate data item 164 by removing it from the candidate application 136, crossing it out, placing a solid block over the information to make it unreadable, generating outputs that exclude such data, or any other way that allows the information to be imperceptible. This could include anonymizing data.

Figure 3:
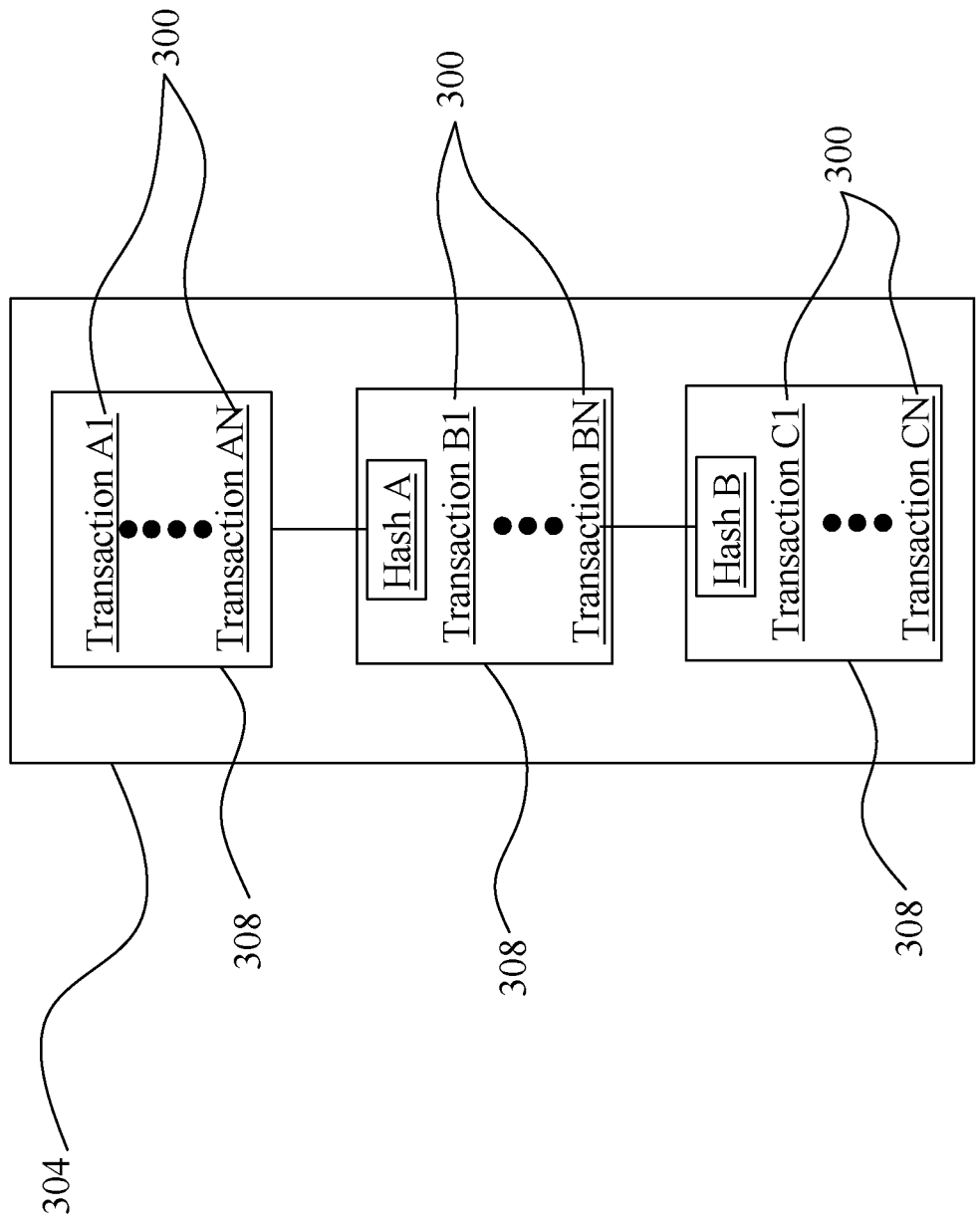
FIG. 3 is a block diagram illustrating an exemplary embodiment of an immutable sequential listing.

Now referring to FIG. 3, an exemplary embodiment of an immutable sequential listing 300 is illustrated. Data elements are listing in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto currency. In one embodiment, a crypto currency is a digital, currency such as Bitcoins, Peercoin's, Namecoins, and Litecoins. Cryptocurrency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto currency to the miners. Quantities of crypto currency may be exchanged using at least a posted content as described above.

Figure 4:
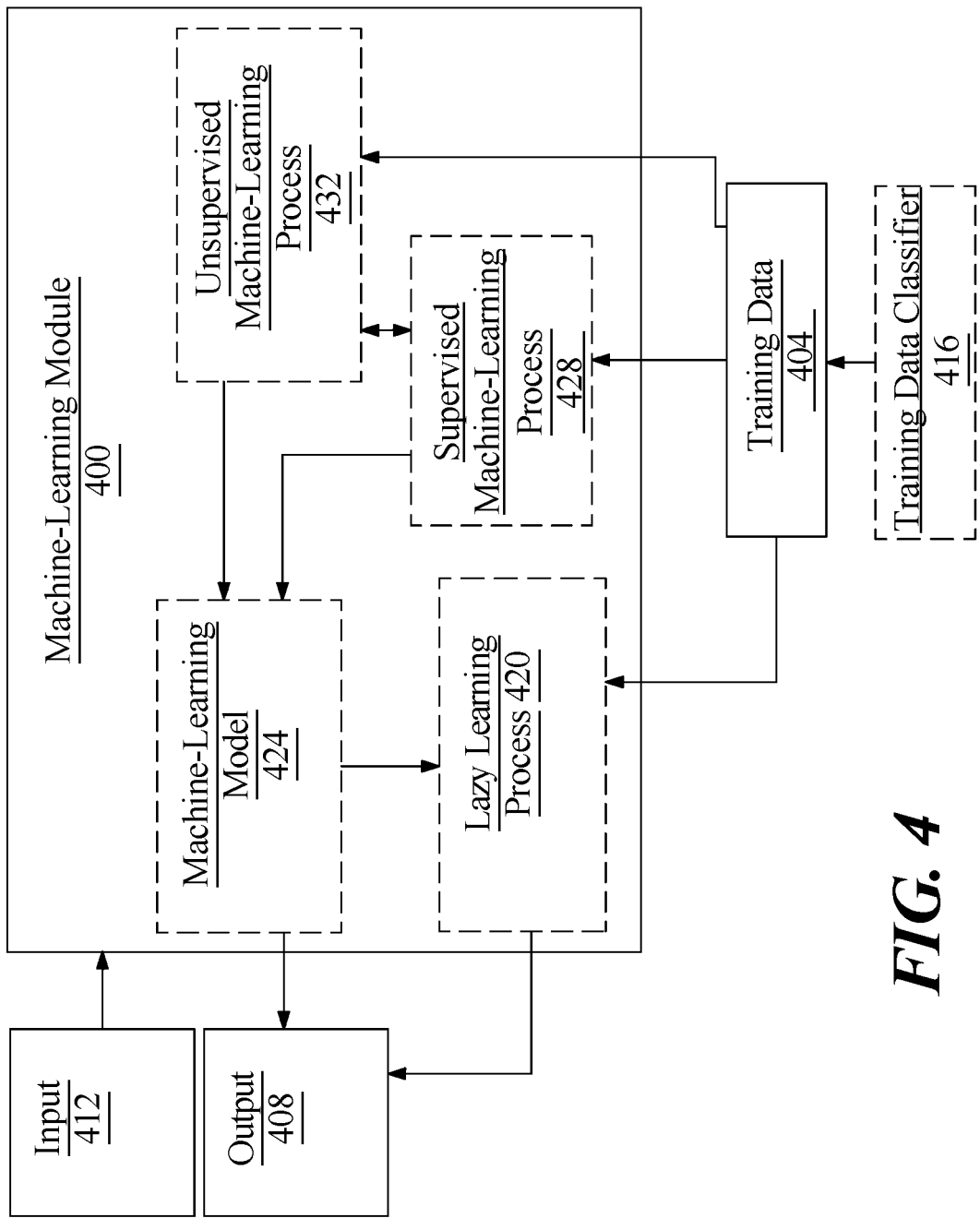
FIG. 4 is a block diagram illustrating an exemplary embodiment of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, inputs of the current disclosure include candidate data items, while outputs include potential biases.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to be associated with categories of potential biases.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include candidate data items as described above as inputs, potential bias outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
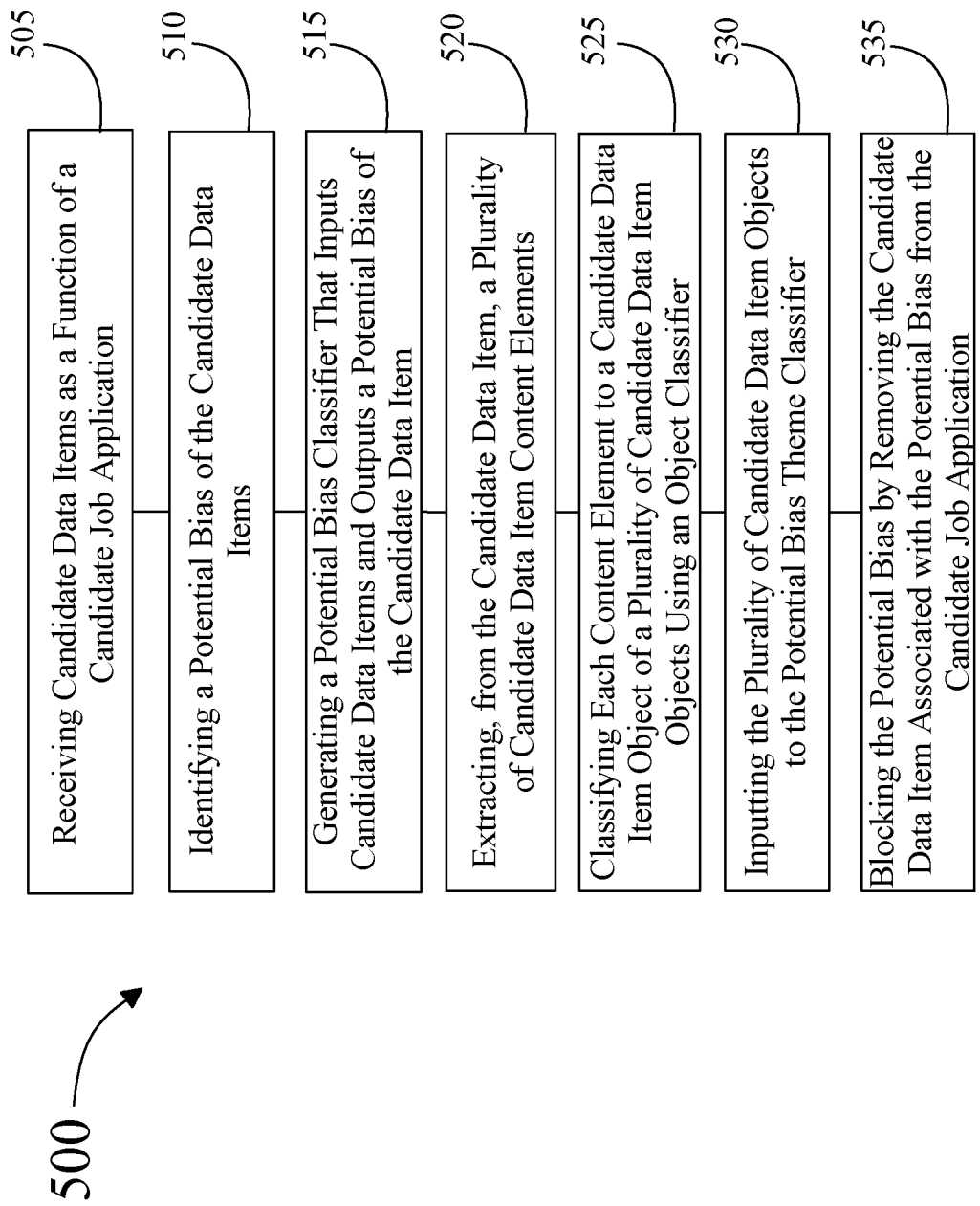
FIG. 5 is a flow diagram illustrating an exemplary embodiment of a method of removing bias in an application.

Referring now to FIG. 5, an exemplary embodiment of a method 500 of neutralizing and classifying bias in an application is illustrated. At step 505, method 500 includes receiving candidate data items as a function of a candidate application. Candidate application is registered on an immutable sequential listing. Immutable sequential listing includes digitally signed assertions.

Still referring to FIG. 5, at step 510, method 500 includes identifying a potential bias of the candidate data items. Identifying a potential bias further comprises identifying a potential bias field.

Still referring to FIG. 5, at step 515, method 500 includes extracting, from the candidate data item, a plurality of candidate data item content elements. To extract a plurality of candidate data item content elements, the computing device is further configured to extract a plurality of textual elements from a candidate application and classify the plurality of textual elements to a potential bias using a linguistic item classifier.

Still referring to FIG. 5, at step 520, method 500 includes classifying each content element of the plurality of candidate item data content elements to a candidate data item object of a plurality of candidate data item objects using an item classifier.

Still referring to FIG. 5, at step 525, method 500 includes generating, using bias training data, a potential bias classifier, wherein the potential bias classifier inputs candidate data item objects and outputs a potential bias of the candidate item.

Still referring to FIG. 5, at step 530, method 500 includes classifying the plurality of candidate data item objects to potential biases using the potential bias theme classifier. Classifying the candidate data item objects to potential biases further comprises identifying a plurality of potential biases and classifying each candidate data item object to a potential bias of the plurality of potential biases. Identifying the plurality of potential biases further comprises querying a bias database.

Still referring to FIG. 5, at step 535, method 500 includes blocking the potential bias by removing the candidate data item associated with the potential bias from the candidate application. Blocking the potential bias includes classifying a candidate data item content element of the plurality of candidate data item content elements to a non-biased element and replacing the candidate data item content element with the non-biased element. Classifying a candidate data item content element to the non-biased element further comprises generating, using a language processing model, a plurality of synonyms of the candidate data item content element and identifying, a synonym of the plurality of synonyms as the non-biased element. Computing device is programmed to block the candidate data item associated with the potential bias by making it unreadable in the candidate application.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
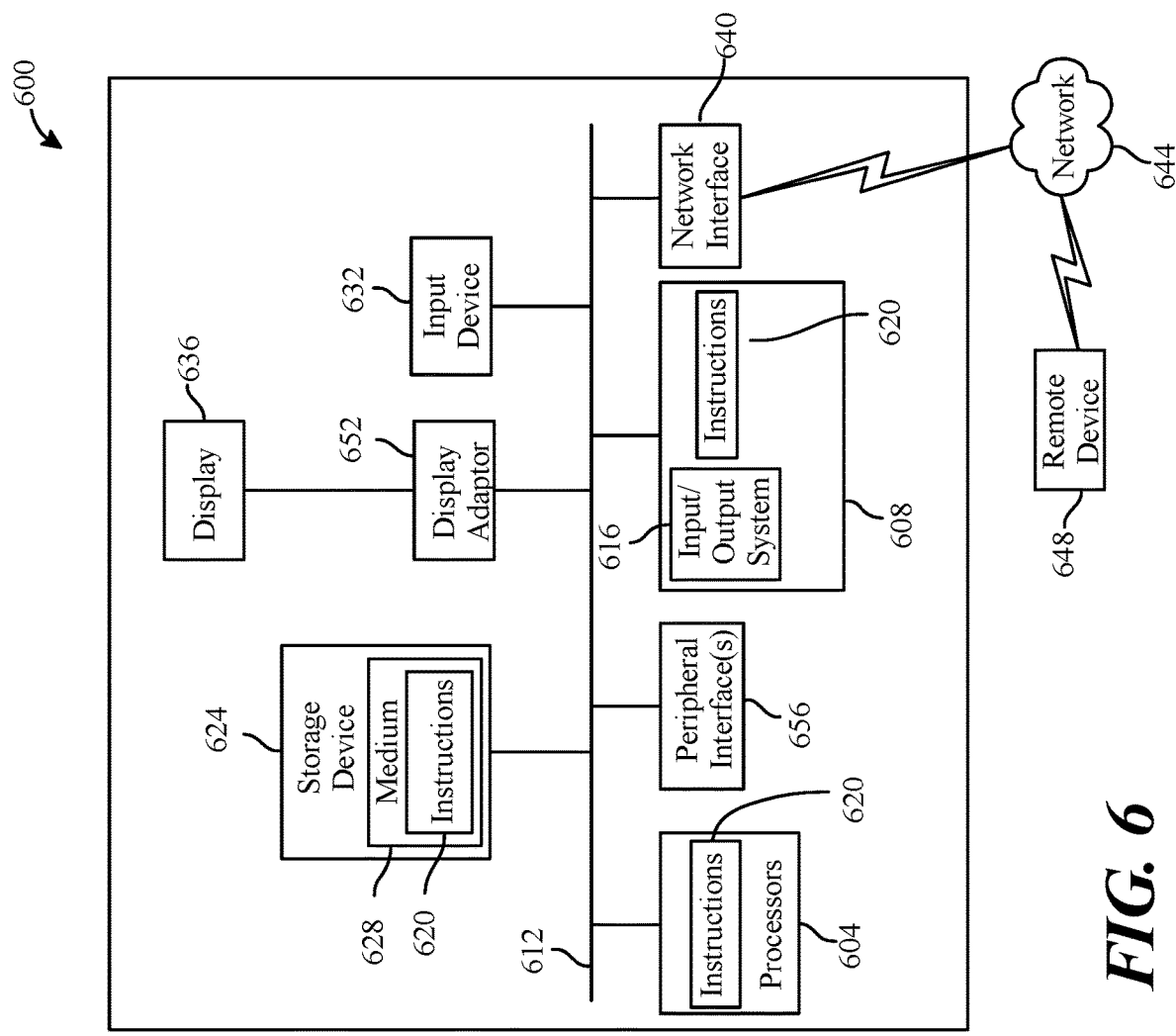
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for classifying and neutralizing bias, wherein the
    apparatus includes:
    at least a processor; and
    a memory communicatively connected to the at least a processor and including instructions configuring the at least a processor to:
        receive candidate data items as a function of a candidate application;
        identify a potential bias of the candidate data items, wherein the identification includes:
            extract, from the candidate data item, a plurality of candidate data item content elements;
            classify each content element of the plurality of candidate item data content elements to a candidate data item object of a plurality of candidate data item objects using an item classifier;

generate, using bias training data, a potential bias classifier, the generating of the potential bias classifier comprising:
creating the bias training data using data from candidate data item objects correlating to potential biases of the candidate data items; and
generating, by the computing device, the potential bias classifier using the bias training data;
identifying the potential bias of the candidate item using the potential bias classifier and the candidate data item objects;
classify the plurality of candidate data item objects to potential biases using the potential bias classifier, wherein the classifying the plurality of candidate data item object comprises:
identifying a plurality of potential biases using a behavior model, wherein the behavior model is generated using a first feature learning algorithm, wherein the first feature learning algorithm receives the candidate data items with the plurality of potential biases as inputs and outputs a plurality of classified data entry clusters; and
classifying each candidate data item object to a potential bias of the plurality of potential biases identified by the behavior model; and
block the potential bias by making the candidate data item associated with the potential bias unreadable in the candidate application.

2. The apparatus of claim 1, wherein candidate application is registered on an immutable sequential listing.

3. The apparatus of claim 2, wherein the immutable sequential listing includes digitally signed assertions.

4. The apparatus of claim 1, wherein identifying a potential bias further comprises identifying a potential bias field.

5. The apparatus of claim 1, wherein identifying the plurality of potential biases further comprises querying a bias database.

6. The apparatus of claim 1, wherein blocking the potential bias includes:
classifying a candidate data item content element of the plurality of candidate data item content elements to a non-biased element; and
replacing the candidate data item content element with the non-biased element.

7. The apparatus of claim 1, wherein classifying a candidate data item content
element to the non-biased element further comprises:
generating, using a language processing model, a plurality of synonyms of the candidate data item content element; and
identifying, a synonym of the plurality of synonyms as the non-biased element.

8. The apparatus of claim 1, wherein, to extract a plurality of candidate data item
content elements, the computing device is further configured to:
extract a plurality of textual elements from a candidate application; and
classify the plurality of textual elements to a potential bias using a linguistic item classifier.

9. A method for an apparatus for classifying and neutralizing bias,
wherein the method is performed by a computing device and includes:
receiving candidate data items as a function of a candidate application;
identifying a potential bias of the candidate data items, wherein the identification includes:
extracting, from the candidate data item, a plurality of candidate data item content elements;
classifying each content element of the plurality of candidate item data content elements to a candidate data item object of a plurality of candidate data item objects using an item classifier;
generating, using bias training data, a potential bias classifier, wherein the potential bias classifier inputs candidate data item objects and outputs a potential bias of the candidate item the generating of the potential bias classifier comprising:
creating the bias training data using data from candidate data item objects correlating to potential biases of the candidate data items; and
generating, by the computing device, the potential bias classifier using the bias training data;
identifying the potential bias of the candidate item using the potential bias classifier and the candidate data item objects;
classifying the plurality of candidate data item objects to potential biases using the potential bias classifier, wherein the classifying the plurality of candidate data item object comprises:
identifying a plurality of potential biases using a behavior model, wherein the behavior model is generated using a first feature learning algorithm, wherein the first feature learning algorithm receives the candidate data items with the plurality of potential biases as inputs and outputs a plurality of classified data entry clusters; and
classifying each candidate data item object to a potential bias of the plurality of potential biases identified by the behavior model; and
blocking the potential bias by making the candidate data item associated with the potential bias unreadable in the candidate application.

10. The method of claim 9, wherein candidate application is registered on an immutable sequential listing.

11. The method of claim 10, wherein the immutable sequential listing includes digitally signed assertions.

12. The method of claim 9, wherein identifying a potential bias further comprises identifying a potential bias field.

13. The method of claim 9, wherein identifying the plurality of potential biases further comprises querying a bias database.

14. The method of claim 9, wherein blocking the potential bias includes:
classifying a candidate data item content element of the plurality of candidate data item content elements to a non-biased element; and
replacing the candidate data item content element with the non-biased element.

15. The method of claim 9, wherein classifying a candidate data item content
element to the non-biased element further comprises:
generating, using a language processing model, a plurality of synonyms of the candidate data item content element; and
identifying, a synonym of the plurality of synonyms as the non-biased element.

16. The method of claim 9, wherein, to extract a plurality of candidate data item
content elements, the computing device is further configured to:

extracting a plurality of textual elements from a candidate application; and classifying the plurality of textual elements to a potential bias using a linguistic item classifier.

* * * * *